April 16, 1957    E. O. SCHMIDT    2,788,782
SEAL BETWEEN CYLINDER BLOCK AND CYLINDER HEAD
Filed Oct. 21, 1954
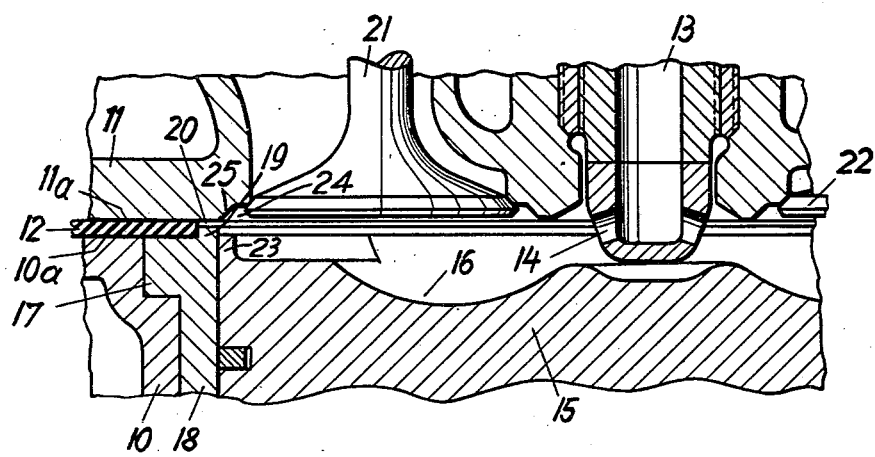
INVENTOR
EKHART O. SCHMIDT
BY Dicke and Craig
ATTORNEYS

United States Patent Office 2,788,782
Patented Apr. 16, 1957

2,788,782

SEAL BETWEEN CYLINDER BLOCK AND CYLINDER HEAD

Ekhart O. Schmidt, Stuttgart-Bad Cannstatt, Germany, assignor to Daimler-Benz Aktiengesellschaft, Stuttgart-Unterturkheim, Germany Application October 21, 1954, Serial No. 463,674

Claims priority, application Germany October 24, 1953

3 Claims. (Cl. 123—193)

This invention relates to a seal between cylinder block and cylinder head of internal combustion engines. The joint between cylinder block and cylinder head is usually sealed by a sheet gasket such as, for example, asbestos gasket, or the like. However, this gasket having usually a thickness of a few millimeters is, at the passage points of the cylinder spaces and combustion chambers respectively, exposed to the high temperatures prevailing therein which very often results in premature destruction of the gasket. This danger is especially great if, as in the case of a precombustion chamber diesel engine, the jet of burning fuel-air mixture is directed against the peripheral portions of the cylinder spaces.

One of the objects of the present invention is to overcome the above drawbacks by providing a construction which distinguishes itself by its protective arrangement of the gasket and hence by a long service life thereof.

Another object of the present invention is to combine both a simple structure in the cylinder block and cylinder head connection and simple machining possibilities of the connecting surfaces on which the gasket is seated with an effective protection of the gasket against overheating and destruction by the gases of combustion.

With these objects in view an important feature of the invention resides in a construction wherein the connecting surfaces of both the cylinder block and cylinder head, between which the sheet gasket is interposed, are even throughout without any projections, and wherein the gasket is shielded towards the cylinder space or combustion chamber by a shoulder-shaped metallic projection, in particular a cylinder liner inserted in the cylinder block.

Most appropriately the gap between this shoulder-shaped projection and the connecting surface located oppositely thereto is only so large as is absolutely necessary for manufacturing and thermal expansion purposes respectively. Generally, a gap of, for example, 0.2 mm. is sufficient for such purpose.

The accompanying drawing illustrates one embodiment of the invention. A sheet gasket 12 of conventional type is interposed between cylinder block 10 and cylinder head 11. The connecting surfaces 10a of the cylinder block and 11a of the cylinder head respectively, against which the gasket is seated, are so formed as to be plane throughout without any projections.

A precombustion chamber 13 opens by means of essentially radial bores 14, which are slightly downwardly inclined, into the main combustion chamber 16 formed by a depression in the piston crown 15, so that the precombustion chamber jets issuing from the bores 14 impinge directly upon the peripheral portions of the cylinder space. In order to shield the gasket towards the cylinder space or main combustion chamber 16 (or towards another combustion chamber) the inserted cylinder liner 18 having a flange-like shoulder 17 is provided adjacent to the cylinder space or combustion chamber 16 with an annular shoulder 19 projecting towards the cylinder head 11, the top surface of the shoulder 19 being separated from the latter only by a gap 20 constituting the minimum mechanical clearance of, for example, 0.2 mm. The piston crown 15 is also provided with a rim portion 23 projecting axially at least along a part of the periphery of the piston in the direction of the cylinder head 11. The rim portion 23 deflects the combustion gases which are discharged from the precombustion chamber into the combustion chamber 16 through bores 14 in a radial direction, thereby enabling the shoulder 19 to perform its protective function with greater efficacy.

A recess provided in the cylinder head 11 and formed therein by the inclined wall 25 extending around the valve 21 and with a portion thereof opposite rim portion 23 further enhances the efficacy thereat of the protective feature in accordance with the present invention as the combustion gases deflected upwardly by the rim portion may escape and enter into the recess 24 formed around the valve seat, and may eventually be redeflected by the wall 25 away from the peripheral portion of the combustion chamber. The inclined wall 25 may be of any suitable slope.

The flange-like shoulder 17 is of such configuration that the gasket 12 rests in part on the plane connecting surfaces 11a and 10a and on the flange-like shoulder 17, whereby the flow of heat between the various parts is facilitated so as to equalize any temperature differences therebetween.

It is thus readily apparent that the hot gases of combustion practically can no longer impinge upon the gasket 12 whereby gasket erosion is prevented and consequently the service life thereof substantially increased.

The numerals 21 and 22 represent two valves, for example, one inlet valve and one outlet valve each, or two of each.

It will be obvious that various modifications may be made in the embodiment above described without in any way departing from the spirit of the invention as defined in the appended claims.

What I claim is:

1. In an internal combustion engine a cylinder block with at least one cylinder, a piston with a piston head in said cylinder adapted for reciprocating movement therein, a cylinder head covering said cylinder block, a combustion chamber formed above said piston head between said cylinder block and said cylinder head, both said cylinder head and said cylinder block being provided with substantially plane connecting surfaces located oppositely each other with but little space therebetween and partially interrupted by said combustion chamber, a sheet gasket in the space provided between said two connecting surfaces, a cylinder liner intermediate said cylinder block and said piston for lining said cylinder inserted in said cylinder block, and a shoulder-like projection on said cylinder liner axially projecting from said plane surface of said cylinder block towards the plane surface of said cylinder head for shielding said gasket in the direction of said combustion chamber, said piston head including a rim portion extending axially in the direction of the cylinder head to deflect the combustion gases impinging thereon.

2. In an internal combustion engine a cylinder block with at least one cylinder, a piston with a piston head in said cylinder adapted for reciprocating movement therein, a cylinder head covering said cylinder block, a combustion chamber formed above said piston head between said cylinder block and said cylinder head, both said cylinder head and said cylinder block being provided with substantially plane connecting surfaces located oppositely each other with but little space therebetween and interrupted in part by said combustion chamber, a precombustion chamber in said cylinder head, connecting passages between said precombustion chamber and said combustion chamber directed essentially radially against the periphery of said combustion chamber, a sheet gasket in the space provided between said two connecting surfaces, and a cylinder lining inserted into one of the two parts forming said plane connecting surfaces and having a shoulder-like projection extending above the connecting surface of said one part in the direction toward the connecting surface of the other part to form but a small gap between said projection and the connecting surface of said other part, said projection shielding said gasket in the direction of said combustion chamber, said piston head including a rim portion extending axially in the direction of the cylinder head to deflect the combustion gases discharged through said connecting passages and impinging thereon.

3. In an internal combustion engine a cylinder block with at least one cylinder, a piston with a piston head in said cylinder adapted for reciprocating movement therein, a cylinder head covering said cylinder block, a combustion chamber formed above said piston head between said cylinder block and said cylinder head, both said cylinder head and said cylinder block being provided with substantially plane connecting surfaces located oppositely each other with but little space therebetween and interrupted in part by said combustion chamber, a precombustion chamber in said cylinder head, connecting passages between said precombustion chamber and said combustion chamber directed essentially radially against the periphery of said combustion chamber, a sheet gasket in the space provided between said two connecting surfaces, and a cylinder lining inserted into one of the two parts forming said plane connecting surfaces and having a flange-like shoulder seated in a complementary recess of said one part and a shoulder-like projection extending above the connecting surface of said one part in the direction toward the connectig surface of the other part to form but a small gap between said projection and the connecting surface of said other part, said projection shielding said gasket in the direction of said combustion chamber, said piston head including a rim portion extending axially in the direction of the cylnder head to deflect the combustion gases discharged through said connecting passages and impinging thereon, and said sheet gasket being seated on both the plane connecting surface of said one part and said flange-like shoulder thereby facilitating the flow of heat therebetween.

References Cited in the file of this patent

UNITED STATES PATENTS

| | | |
|---|---|---|
| 1,005,118 | Rabsilber | Oct. 3, 1911 |
| 1,880,643 | Woolson | Oct. 3, 1932 |
| 2,658,493 | Kloss | Nov. 10, 1953 |
| 2,676,580 | Hollingsworth | Apr. 27, 1954 |
| 2,679,241 | Dickson | May 25, 1954 |
| 2,744,514 | Vidmar | May 8, 1956 |

FOREIGN PATENTS

| | | |
|---|---|---|
| 238,933 | Great Britain | Aug. 26, 1925 |
| 391,386 | Great Britain | Apr. 27, 1933 |
| 401,024 | Great Britain | Nov. 9, 1933 |
| 674,713 | Great Britain | June 25, 1952 |